S. T. HOLLY.
Harvester Rake.

No. 112,341.

2 Sheets—Sheet 1.

Patented Mar. 7, 1871.

Witnesses:
Fred Artos
W. H. Rome

Inventor:
Solomon T. Holly
by his atty
Wm D. Baldwin

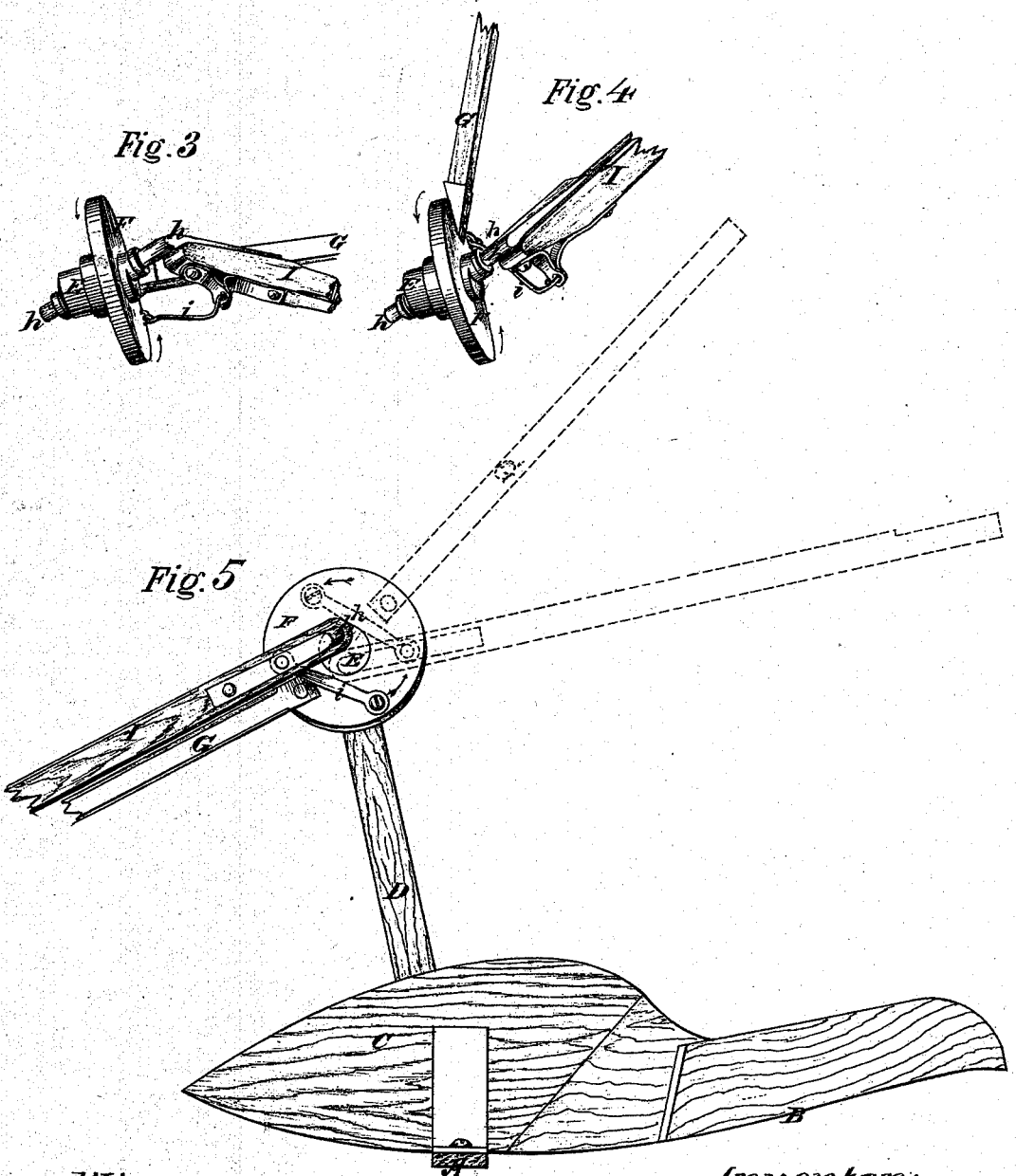

UNITED STATES PATENT OFFICE.

SOLOMON T. HOLLY, OF ROCKFORD, ILLINOIS, ASSIGNOR TO JOHN P. MANNY, OF SAME PLACE.

IMPROVEMENT IN HARVESTER-RAKES.

Specification forming part of Letters Patent No. 112,341, dated March 7, 1871.

*To all whom it may concern:*

Be it known that I, SOLOMON T. HOLLY, of Rockford, in the county of Winnebago and State of Illinois, have invented certain new and useful Improvements in Harvester-Rakes, of which the following is a full, clear, and exact description, reference being had to the accompanying drawing, which makes part of this specification, and in which—

Figure 1:
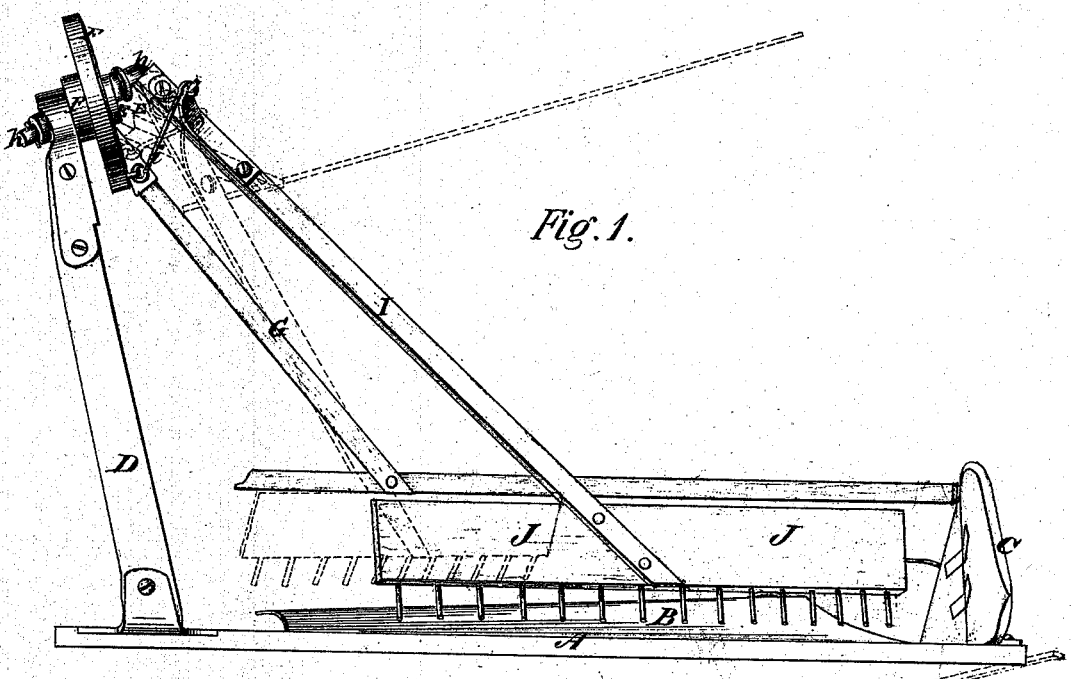
Figure 2:
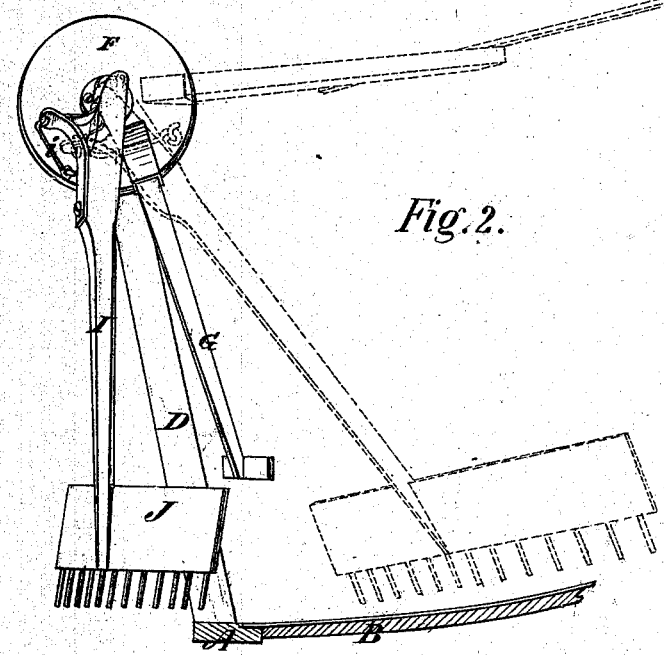

Figure 1 represents a front elevation of so much of a harvester embracing my improvements as is necessary to illustrate the invention herein claimed; Fig. 2, an elevation of the same as seen from the divider side thereof, with the rake and platform in section; Figs. 3 and 4, views in perspective of portions of the rake and reel detached, and Fig. 5 a view of a modification of my invention.

My invention relates to that class of combined reels and rakes in which both the reel and the rake revolve in fixed paths eccentric to each other, and constitutes an improvement on a machine invented by John P. Manny, of Rockford, Illinois; and the invention herein claimed consists in certain novel combinations of mechanism, hereinafter described, for producing the relative movements of the rake and reel by means of links and eccentrics, instead of the gearing used by said Manny for a like purpose.

Figs. 1, 2, 3, and 4 represent one form of my invention, in which figures A represents a finger-beam; B, a concave platform, and C a divider and guard-board.

A post, D, mounted on the finger-beam, and inclined slightly from the platform, supports a stud-axle, E, inclined upward from the post toward the platform, and also inclined slightly backward from the finger-beam. A hub, F, turning freely on this axle, carries a series of four or more reel-arms, G, (one only of which is shown in the drawing,) firmly secured to the hub. A shaft, $h$, passes angularly through the axle E, and turns freely in proper bearings therein. This shaft, it will be observed, inclines farther, both upward and backward, than the axle E, and carries an arm, I, to which a rake-head, J, may be fastened in any proper way that will admit of its being securely held and adjusted properly relatively to the finger-beam or platform. A link, $i$, is pivoted at one end by a swiveling joint to the hub, and at the other, by a like joint, to a stud on the rake-arm.

In Fig. 5 the same principle is represented as embodied in a form more readily understood than that shown in the other figures. In this figure the parts are the same as in the other figures, and are similarly lettered; but in Fig. 5 the axle E and shaft $h$ are parallel to each other, but their centers are eccentric, while in the other figures they are shown as arranged at an angle to each other and with eccentric centers.

I will now proceed to describe the operation of the machine, premising that my improvements are to be applied to a fully-organized harvester: As the hub rotates, the reel-ribs and hub revolve at a uniform speed, and in a uniform path, in the usual manner. As the rake descends to the finger-beam, the distance between the center of the rake-shaft and the pivot of the link $i$ on the hub constantly increases until the rake has reached the finger-beam, as shown by the full lines in Figs. 1 and 2, at which time these two points attain their greatest distance apart. The result of this relation of the parts is, that as the distance between these points increases, the link $i$ draws the rake forward more rapidly than the hub rotates, and it consequently gains on the reel-rib in advance of it, entering the standing grain just behind it.

I do not broadly claim varying the velocity of the rake relatively to that of the reel, nor the use of axes for the rake and reel eccentric to each other.

I claim as my invention—

The combination of the reel revolving on a fixed stud, the rake rotating on a shaft eccentric to and passing through the reel-hub, and a link connecting the rake-arm with the reel-hub, all these members being constructed and operating substantially as set forth, so as to dispense with guides, cams, or gearing.

In testimony whereof I have hereunto subscribed my name.

SOLOMON T. HOLLY.

Witnesses:
RUFUS C. BAILEY,
CHARLES W. CROSS.